US012086174B2

(12) United States Patent
Sun et al.

(10) Patent No.: US 12,086,174 B2
(45) Date of Patent: Sep. 10, 2024

(54) SENTENCE DATA ANALYSIS INFORMATION GENERATION DEVICE USING ONTOLOGY, SENTENCE DATA ANALYSIS INFORMATION GENERATION METHOD, AND SENTENCE DATA ANALYSIS INFORMATION GENERATION PROGRAM

(71) Applicant: Nippon Telegraph and Telephone Corporation, Tokyo (JP)

(72) Inventors: Jingyu Sun, Musashino (JP); Susumu Takeuchi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/912,236

(22) PCT Filed: Apr. 10, 2020

(86) PCT No.: PCT/JP2020/016095
§ 371 (c)(1),
(2) Date: Sep. 16, 2022

(87) PCT Pub. No.: WO2021/205639
PCT Pub. Date: Oct. 14, 2021

(65) Prior Publication Data
US 2023/0140938 A1    May 11, 2023

(51) Int. Cl.
*G06F 16/36* (2019.01)
*G06F 40/137* (2020.01)
*G06F 40/205* (2020.01)

(52) U.S. Cl.
CPC .......... *G06F 16/367* (2019.01); *G06F 40/137* (2020.01); *G06F 40/205* (2020.01)

(58) Field of Classification Search
CPC ..... G06F 16/367; G06F 40/137; G06F 40/205
See application file for complete search history.

(56) References Cited

U.S. PATENT DOCUMENTS 8,190,643 B2 * 5/2012 Oliver .................... G06F 16/36
707/791
8,359,193 B2 * 1/2013 Chen ...................... G06F 40/30
704/9
(Continued)

FOREIGN PATENT DOCUMENTS

CN    107239481 A  * 10/2017   ........... G06F 16/353
CN    110991185 A  *  4/2020   ............ G06F 16/35
(Continued)

OTHER PUBLICATIONS

Niklaus et al., "A survey on open information extraction," arXiv preprint arXiv:1806.05599, Jun. 14, 2018, 13 pages.

*Primary Examiner* — Benjamin Smith
(74) *Attorney, Agent, or Firm* — Fish & Richardson P.C.

(57) ABSTRACT

A text data analysis information generation device includes: a dependence relationship tree information generation unit configured to generate dependence relationship tree information that indicates, in a tree structure, a dependence relationship between words in text data to be analyzed; a graph information generation unit configured to extract a subject, a predicate, and an object from the text data based on the generated dependence relationship tree information, and generate graph information that indicates, in a graph structure, triple information of ontology that consists of them; and a hierarchical concept information adding unit configured to extract two suitable components from the text data, acquire broader concept information that is common between the two components, and add the acquired broader concept information to the graph information as a parent node that is common between the two components so as to generate text data analysis information.

12 Claims, 10 Drawing Sheets

(56) References Cited

U.S. PATENT DOCUMENTS

| | | | | |
|---|---|---|---|---|
| 8,412,718 B1* | 4/2013 | Bilger | G06Q 30/0631 | 707/758 |
| 8,566,321 B2* | 10/2013 | Majumdar | G06F 16/355 | 707/804 |
| 8,689,171 B2* | 4/2014 | Lucas | G06F 9/4494 | 717/104 |
| 8,747,115 B2* | 6/2014 | Lorge | G09B 7/02 | 434/350 |
| 9,298,817 B2* | 3/2016 | Lorge | G06N 5/047 | |
| 9,317,814 B2* | 4/2016 | Byron | G06N 5/022 | |
| 9,805,020 B2* | 10/2017 | Gorman | G06F 40/30 | |
| 9,817,814 B2* | 11/2017 | Misra | G06F 16/3329 | |
| 9,916,381 B2* | 3/2018 | Antonelli | G06F 16/353 | |
| 9,940,321 B2* | 4/2018 | Morehead | G06F 40/205 | |
| 10,372,724 B2* | 8/2019 | Majumdar | G06F 16/367 | |
| 10,387,575 B1* | 8/2019 | Shen | G06F 40/35 | |
| 10,592,610 B1* | 3/2020 | Shen | G06F 40/30 | |
| 10,606,958 B2* | 3/2020 | Bacarella | G06N 5/043 | |
| 10,628,743 B1* | 4/2020 | Kalukin | G06F 16/90332 | |
| 10,719,668 B2* | 7/2020 | Morehead | G06F 40/30 | |
| 10,846,485 B2* | 11/2020 | Bacarella | G06N 5/022 | |
| 10,922,271 B2* | 2/2021 | Atias | G06F 18/23 | |
| 11,138,380 B2* | 10/2021 | Mwarabu | G06N 3/08 | |
| 11,157,467 B2* | 10/2021 | Lei | G06F 16/9024 | |
| 11,386,096 B2* | 7/2022 | Malik | G06F 16/9024 | |
| 11,514,315 B2* | 11/2022 | Xie | G06N 3/08 | |
| 11,531,812 B2* | 12/2022 | Xia | G06F 40/30 | |
| 11,580,127 B1* | 2/2023 | Newman | G06F 16/9024 | |
| 11,636,270 B2* | 4/2023 | Lin | G06F 40/205 | 704/9 |
| 2005/0043940 A1* | 2/2005 | Elder | G06F 16/24522 | 704/9 |
| 2006/0074980 A1* | 4/2006 | Sarkar | G06F 16/958 | |
| 2009/0012842 A1* | 1/2009 | Srinivasan | G06F 16/3344 | 707/999.005 |
| 2009/0265686 A1* | 10/2009 | Lucas | G06F 9/4494 | 717/120 |
| 2009/0292716 A1* | 11/2009 | Oliver | G06F 16/36 | 707/999.102 |
| 2011/0161070 A1* | 6/2011 | Chen | G06F 40/30 | 704/9 |
| 2011/0264699 A1* | 10/2011 | Antonelli | G06F 16/353 | 707/777 |
| 2012/0233188 A1* | 9/2012 | Majumdar | G06F 16/258 | 707/756 |
| 2013/0260358 A1* | 10/2013 | Lorge | G06N 5/025 | 434/362 |
| 2014/0032580 A1* | 1/2014 | Majumdar | G06F 16/367 | 707/756 |
| 2014/0237000 A1* | 8/2014 | Lorge | G06N 5/04 | 707/794 |
| 2014/0289173 A1* | 9/2014 | Byron | G06N 5/022 | 706/12 |
| 2015/0186504 A1* | 7/2015 | Gorman | G06F 40/30 | 707/752 |
| 2016/0117590 A1* | 4/2016 | Byron | G06N 20/00 | 706/61 |
| 2016/0267078 A1* | 9/2016 | Morehead | G06F 40/58 | |
| 2017/0132329 A1* | 5/2017 | Yakout | G06F 16/9024 | |
| 2018/0225372 A1* | 8/2018 | Lecue | G06F 16/36 | |
| 2018/0232443 A1* | 8/2018 | Delgo | G06F 16/35 | |
| 2019/0213260 A1* | 7/2019 | Bacarella | H04L 67/104 | |
| 2019/0228074 A1* | 7/2019 | Morehead | G06F 40/216 | |
| 2019/0278777 A1* | 9/2019 | Malik | G06F 40/30 | |
| 2020/0019613 A1* | 1/2020 | Bacarella | G06F 40/20 | |
| 2020/0110816 A1* | 4/2020 | Atias | G06F 16/168 | |
| 2020/0242146 A1* | 7/2020 | Kalukin | G06F 16/3329 | |
| 2020/0394267 A1* | 12/2020 | Mwarabu | G06N 20/00 | |
| 2021/0056263 A1* | 2/2021 | Xia | G06F 40/268 | |
| 2021/0073474 A1* | 3/2021 | Sengupta | G06F 40/30 | |
| 2021/0073628 A1* | 3/2021 | Xie | G06F 18/213 | |
| 2021/0232770 A1* | 7/2021 | Lin | G06F 16/532 | |
| 2021/0233658 A1* | 7/2021 | Van Assel | G16H 70/60 | |
| 2021/0263898 A1* | 8/2021 | Lei | G06F 16/9024 | |
| 2021/0286834 A1* | 9/2021 | Morse | G06F 16/367 | |

FOREIGN PATENT DOCUMENTS

| | | | | |
|---|---|---|---|---|
| CN | 111160030 B | * | 9/2023 | |
| JP | 2019215713 A | * | 12/2019 | G06F 16/2455 |
| WO | WO-2010050675 A2 | * | 5/2010 | G06F 17/279 |

\* cited by examiner

SENTENCE DATA ANALYSIS INFORMATION GENERATION DEVICE USING ONTOLOGY, SENTENCE DATA ANALYSIS INFORMATION GENERATION METHOD, AND SENTENCE DATA ANALYSIS INFORMATION GENERATION PROGRAM

CROSS-REFERENCE TO RELATED APPLICATIONS

This application is a National Stage application under 35 U.S.C. § 371 of International Application No. PCT/JP2020/016095, having an International Filing Date of Apr. 10, 2020. The disclosure of the prior application is considered part of the disclosure of this application, and is incorporated by reference in its entirety into this application.

TECHNICAL FIELD

The present invention relates to an ontology-based text data analysis information generation device, text data analysis information generation method, and text data analysis information generation program.

BACKGROUND ART

Text data used in enterprises includes an enormous amount of human knowledge information, and for effective utilization of the information, it is necessary to formulate the text data as structured data that can be analyzed by a computer.

However, 80% or more of text data used in enterprises and the like is not formulated as such structured data, and specifically, most text data does not have a structural definition.

For efficient and effective utilization of knowledge information in text data, it is necessary to analyze the data and extract three components, namely, subject, predicate, and object as triple information of ontology. The process for extracting triple information using text data analysis is referred to as knowledge extraction.

CITATION LIST

Non Patent Literature

[NPL 1] Christina Niklaus et al. "A Survey on Open Information Extraction"

SUMMARY OF THE INVENTION

Technical Problem

A conventional method of knowledge extraction is to perform knowledge extraction, by defining a triple information extraction rule and a triple information extraction pattern and manually designating a predicate of triple information. In this method, only triple information relating to a specific predicate cannot be extracted, and thus knowledge information extracted from text data may have a deficit, and the accuracy of the knowledge extraction may be less accurate. Also, an operation of defining an extraction pattern in terms of predicate is dependent on individual skills and requires a large amount of labor.

Another method of knowledge extraction is to extract triple information using OpenIE (Open Information Extraction). In this method, by defining a rule and a pattern for extracting triple information to be extracted, it is possible to extract a larger amount of triple information from text data without designating a predicate. However, even when triple information is extracted with this method, information that can be utilized as knowledge information is only triple information consisting of words used in the text, and information similar to the triple information cannot used, causing the problem that the method lacks versatility.

Also, some methods using OpenIE require a large amount of teaching data to learn extraction rules or extraction patterns to be added to words in the text of text data, causing the problem that advance preparation is very troublesome.

The present invention was made in view of the above-described circumstances, and an object thereof is to provide an ontology-based text data analysis information generation device, text data analysis information generation method, and text data analysis information generation program.

Means for Solving the Problem

To achieve the above-described object, an ontology-based text data analysis information generation device according to an embodiment includes: a dependence relationship tree information generation unit configured to generate dependence relationship tree information that indicates, in a tree structure, a dependence relationship between words in text data to be analyzed; a graph information generation unit configured to extract a subject, a predicate, and an object from the text data based on the dependence relationship tree information generated by the dependence relationship tree information generation unit, and generate graph information that indicates, in a graph structure, triple information of ontology that consists of the extracted subject, predicate, and object; and a hierarchical concept information adding unit configured to extract two suitable components from the text data, acquire broader concept information that is common between the two components, and add the acquired broader concept information to the graph information as a parent node that is common between the two components so as to generate text data analysis information.

Also, An ontology-based text data analysis information generation method according to the embodiment includes: a dependence relationship tree information generation step of generating dependence relationship tree information that indicates, in a tree structure, a dependence relationship between words in text data to be analyzed; a graph information generation step of extracting a subject, a predicate, and an object from the text data based on the dependence relationship tree information generated in the dependence relationship tree information generation step, and generating graph information that indicates, in a graph structure, triple information of ontology that consists of the extracted subject, predicate, and object; and a hierarchical concept information adding step of extracting two suitable components from the text data, acquiring broader concept information that is common between the two components, and adding the acquired broader concept information to the graph information as a parent node that is common between the two components so as to generate text data analysis information.

Also, a text data analysis information generation program according to the embodiment is a text data analysis information generation program for configuring the text data analysis information generation device according to any one of claims 1 to 5 on a computer.

Effects of the Invention

According to the ontology-based text data analysis information generation device, text data analysis information generation method, and text data analysis information generation program of the present invention, it is possible to analyze text data, extract knowledge information with accuracy, and generate information that can be efficiently and effectively utilized.

DESCRIPTION OF EMBODIMENTS

Figure 1:
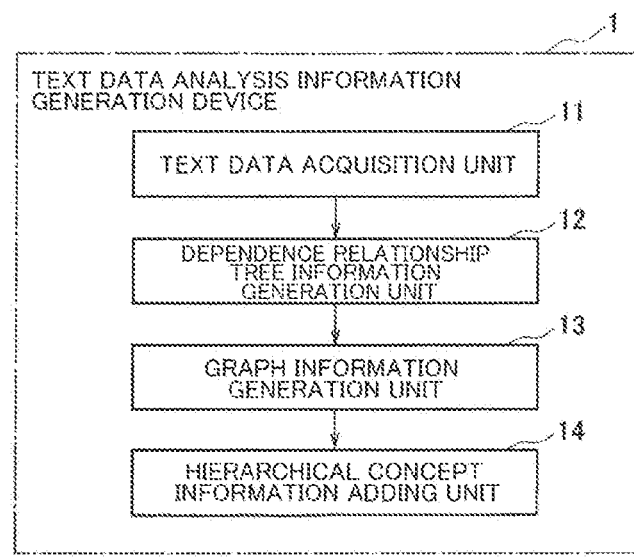
FIG. 1 is a block diagram illustrating a configuration of a text data analysis information generation device according to an embodiment of the present invention.

Configuration of Ontology-Based Text Data Analysis Information Generation Device According to Embodiment A configuration of an ontology-based text data analysis information generation device according to an embodiment of the present invention will be described with reference to FIG. 1. A text data analysis information generation device 1 according to the present embodiment includes a text data acquisition unit 11, a dependence relationship tree informa-tion generation unit 12, a graph information generation unit 13, and a hierarchical concept information adding unit 14.

The text data acquisition unit 11 acquires text data to be analyzed. The dependence relationship tree information generation unit 12 divides the text data acquired by the text data acquisition unit 11 into a subject and the remaining part other than the subject. Then, the dependence relationship tree information generation unit 12 divides the part other than the subject into words, and generates dependence relationship tree information that indicates the dependence relationship between these words in a tree structure.

The graph information generation unit 13 extracts a predicate and an object from the text data based on the dependence relationship tree information generated by the dependence relationship tree information generation unit 12, and generates graph information that indicates, in a graph structure, triple information of ontology consisting of the extracted subject, predicate, and object.

The hierarchical concept information adding unit 14 extracts two suitable components (entities) from the text data, and acquires broader concept information that is common between the extracted two entities. Also, the hierarchical concept information adding unit 14 adds the acquired broader concept information, serving as a parent node common between the two entities, to the graph information generated by the graph information generation unit 13, and generates text data analysis information.

Figure 2:
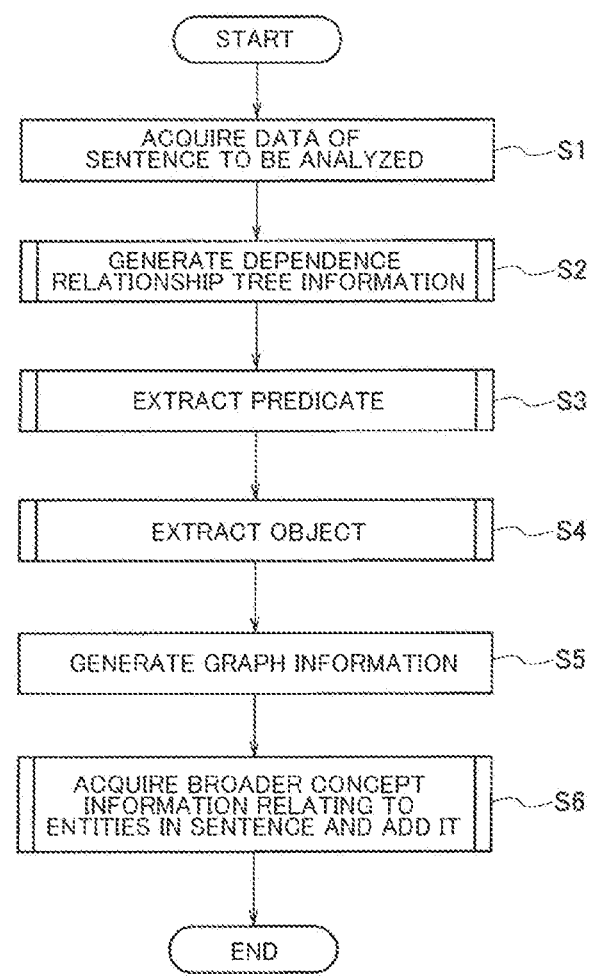
FIG. 2 is a flowchart illustrating a flow of overall processing that is executed by the text data analysis information generation device according to the embodiment of the present invention.

Operation of Ontology-Based Text Data Analysis Information Generation Device According to Embodiment An example of an operation that is executed by the ontology-based text data analysis information generation device 1 according to an embodiment will be described with reference to FIG. 2. According to the present embodiment, in the graph information generation unit 13 of the text data analysis information generation device 1, information is set in advance that indicates a processing procedure for extracting predicates and objects in text data based on dependence relationship tree information that indicates, in a tree structure, the dependence relationship between words of the text data. The specific processing procedure will be described later.

First, the text data acquisition unit 11 acquires data of sentence S to be analyzed "the fund ID is subjected to setting to a code that is managed by a user, based on X in the case of subordinated trust" (S1).

Figure 3:
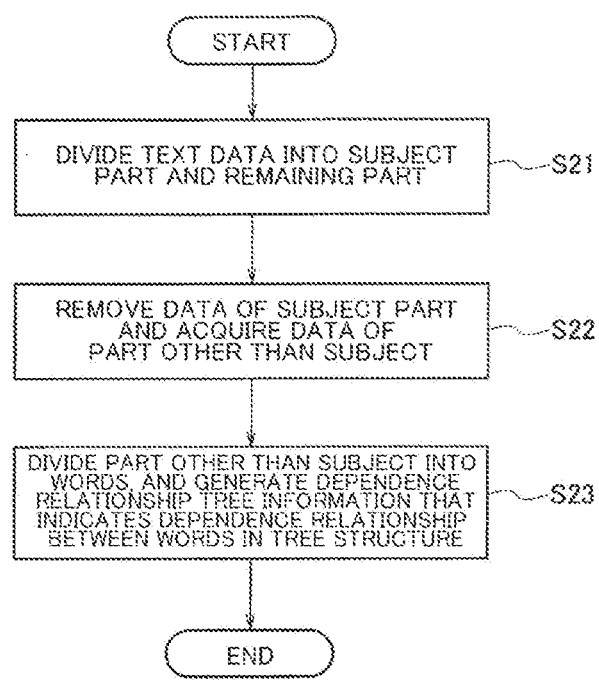
FIG. 3 is a flowchart illustrating a flow of processing for generating dependence relationship tree information, the processing being executed by the text data analysis information generation device according to the embodiment of the present invention.

Then, the dependence relationship tree information generation unit 12 generates dependence relationship tree information that indicates the dependence relationship between words of the sentence S acquired by the text data acquisition unit 11 (S2). The following will describe the processing for generating the dependence relationship tree information of the sentence S that is executed by the dependence relationship tree information generation unit 12, with reference to the flowchart of FIG. 3.

First, the data of the sentence S acquired by the text data acquisition unit 11 is divided into a subject part "the fund ID" and the remaining part other than the subject "is subjected to setting to a code that is managed by a user, based on X in the case of subordinated trust".

Then, the data of the subject part "the fund ID" is removed, and the data of the remaining part "is subjected to setting to a code that is managed by a user, based on X in the case of subordinated trust" other than the subject is acquired (S22).

Figure 4:
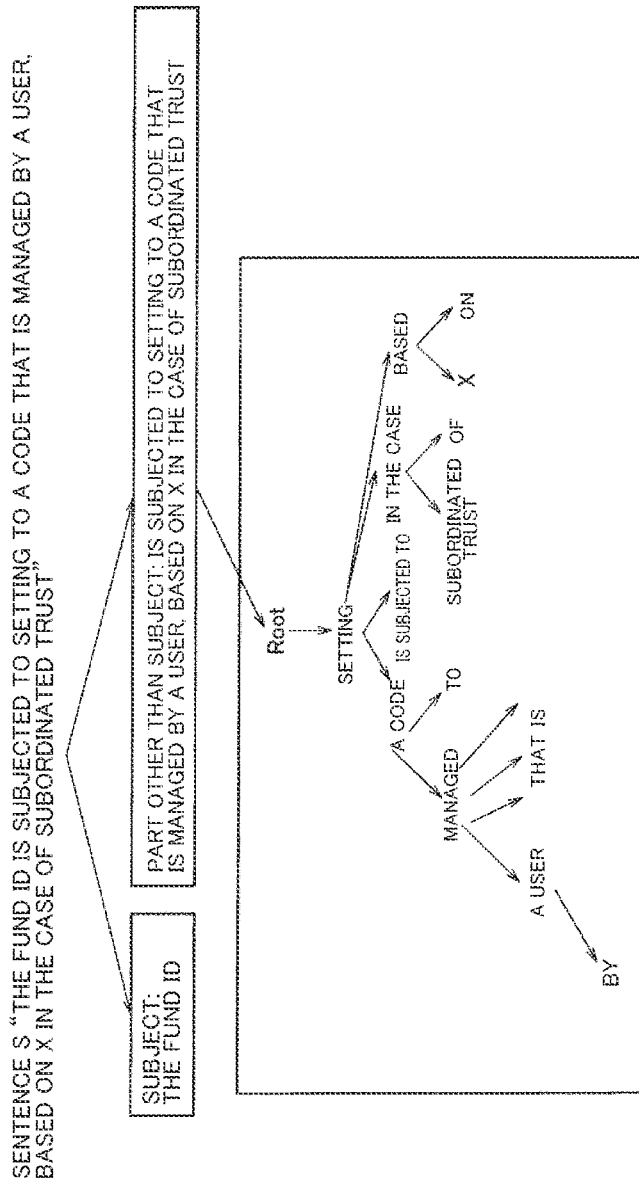
FIG. 4 illustrates an example of the dependence relationship tree information generated by the text data analysis information generation device according to the embodiment of the present invention.

Then, library information or the like that uses an existing POS (Part-of-speech) tag is utilized, so that the remaining part of the sentence S other than the subject is divided into the words "is (subjected to)", "setting", "to", "a", "code", "managed", "by", "a", "user", "based", "on", "X", "in", "the", "case", "of", "subordinated", and "trust", and dependence relationship tree information that indicates the dependence relationship between these words in a tree structure is generated (S23). The generated dependence relationship tree information is shown in FIG. 4.

Figure 5:
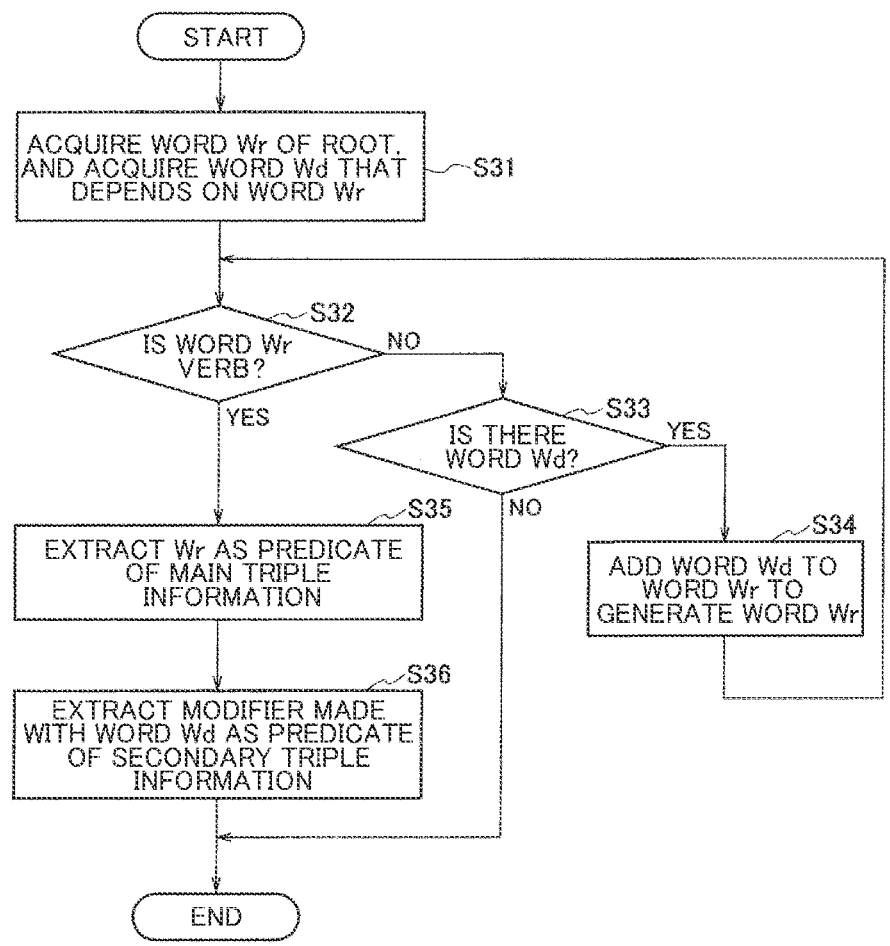
FIG. 5 is a flowchart illustrating a flow of processing for extracting a predicate from text data, the processing being executed by the text data analysis information generation device according to the embodiment of the present invention.

Returning to FIG. 2, the graph information generation unit 13 extracts a predicate of the sentence S based on the dependence relationship tree information generated by the dependence relationship tree information generation unit 12 (S3). The following will describe the processing for extracting a predicate of the sentence S that is executed by the graph information generation unit 13, with reference to the flowchart of FIG. 5.

First, the word Wr "setting" of the root of the dependence relationship tree information is acquired, and four words Wd that depend on this root word Wr "setting", specifically, the word Wd1 "is (subjected to)", the Wd2 "code", the Wd3 "case", and the Wd4 "based", are further acquired (S31). Here, the root word Wr "setting" is a noun ("NO" in S32), and thus the procedure moves to step S33.

Also, since there are the words Wd that depend on this word Wr "setting" ("YES" in S33), "is subjected to setting" that is obtained by adding the word Wd1 "is (subjected to)", which is one of the corresponding words Wd, to the word Wr is generated as a new root word Wr (S34), and the procedure returns to step S32.

Here, since the new root word Wr "is subjected to setting" is a verb ("YES" in S32), the procedure moves to step S35, and the word Wr "is subjected to setting" is extracted as a predicate Pm of the main triple information of the ontology relating to the sentence S (S35). The triple information of ontology refers to information consisting of three components, namely, subject, predicate, and object, and the main triple information refers to triple information consisting of a main content component of the sentence S.

Also, modifiers that each consist of another word Wd and auxiliary verbs that depends on the word Wd, specifically, "in the case of" consisting of the Wd3 "case" and auxiliary verbs "in", "the" "of", and "based on" consisting of the Wd4 "based" and an auxiliary verb "on" are extracted as predicates Ps1 and Ps2 of secondary triple information (S36). The secondary triple information refers to triple information consisting of a component that is lower order than the main triple information in the sentence S.

That is to say, the verb word of the root of the dependence relationship tree information is extracted as the predicate Pm of the main triple information of the data of the sentence S, and the modifier words that depend on the word of the root are extracted as the predicates Ps1 and Ps2 of the secondary triple information of the data of the sentence S.

Figure 6:
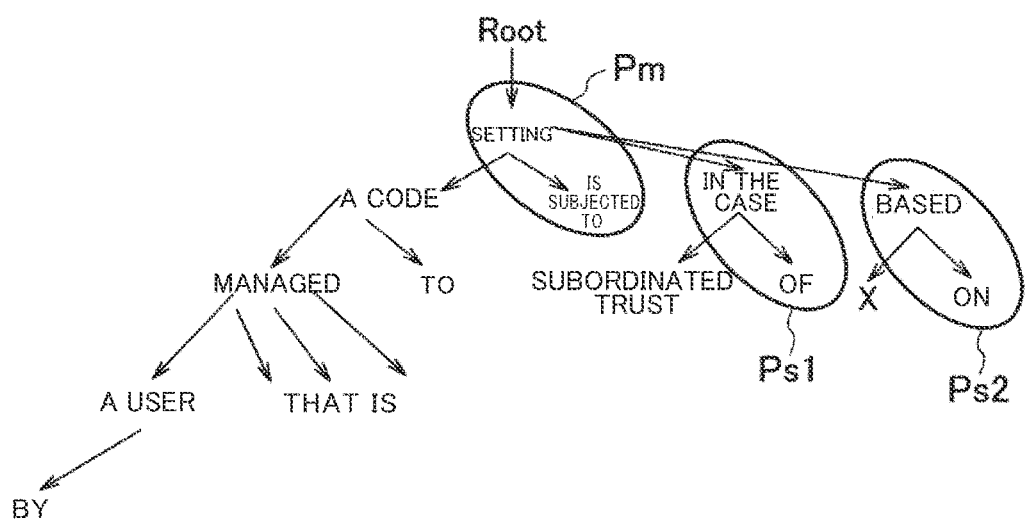
FIG. 6 is an example of an illustrative diagram in which an extracted predicate part is indicated on the dependence relationship tree information generated by the text data analysis information generation device according to the embodiment of the present invention.

FIG. 6 shows a diagram in which, of the dependence relationship tree information, the predicate Pm "is subjected to setting" of the main triple information, and the predicate Ps1 "in the case of" and the predicate Ps2 "based on" of the secondary triple information are each surrounded by a circle.

Figure 7:
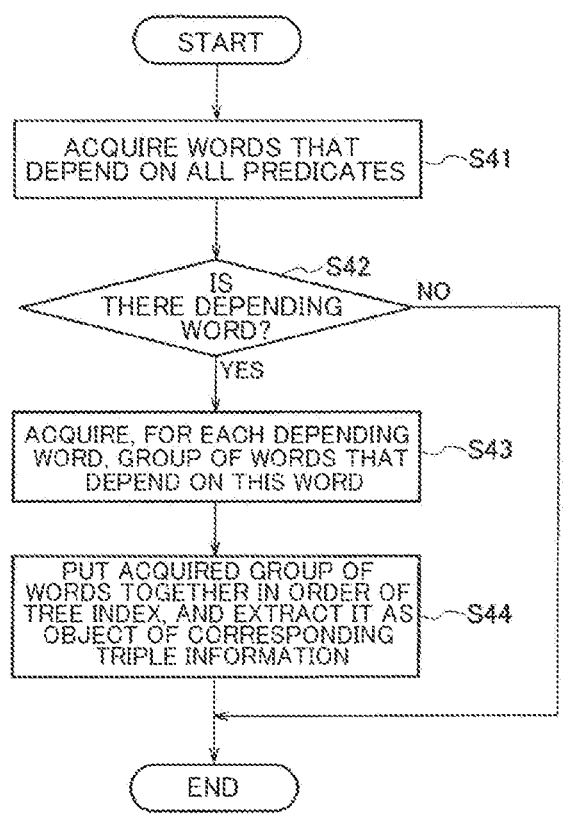
FIG. 7 is a flowchart illustrating a flow of processing for extracting an object from text data, the processing being executed by the text data analysis information generation device according to the embodiment of the present invention.

Returning to FIG. 2, the graph information generation unit 13 extracts an object of the sentence S based on the dependence relationship tree information generated by the dependence relationship tree information generation unit 12 (S4). The following will describe the processing for extracting an object of the sentence S that is executed by the graph information generation unit 13, with reference to the flowchart of FIG. 7.

First, words that depend on all of the predicates extracted in step S3 are acquired (S41). Here, the word "code" that depends on the predicate Pm "is subjected to setting" of the main triple information, the word "subordinated trust" that depends on the predicate Ps1 "in the case of" of the secondary triple, and the word "X" that depends on the predicate Ps2 "based on" of the secondary triple are acquired.

If the words that depend on these predicates are acquired ("YES" in S42), for each of the acquired words, a group of words that depend on the corresponding word are acquired (S43). Here, a group of words "managed", "by", "a", and "user" that depend on the acquired word "code" are acquired.

Then, the group of words that depends on each of the predicates is put together in the order of a tree index based on the tree structure, and is extracted as the object of the triple information (S44). Here, "a code that is managed by a user" is extracted as an object Om of the main triple information, "subordinated trust" is extracted as an object Os1 of the secondary triple information, and "X" is extracted as an object Os2 of the secondary triple information.

That is to say, text parts each consisting of a group of words that depends on an extracted predicate are extracted as objects of the corresponding types of triple information of the data of the sentence S.

Figure 8:
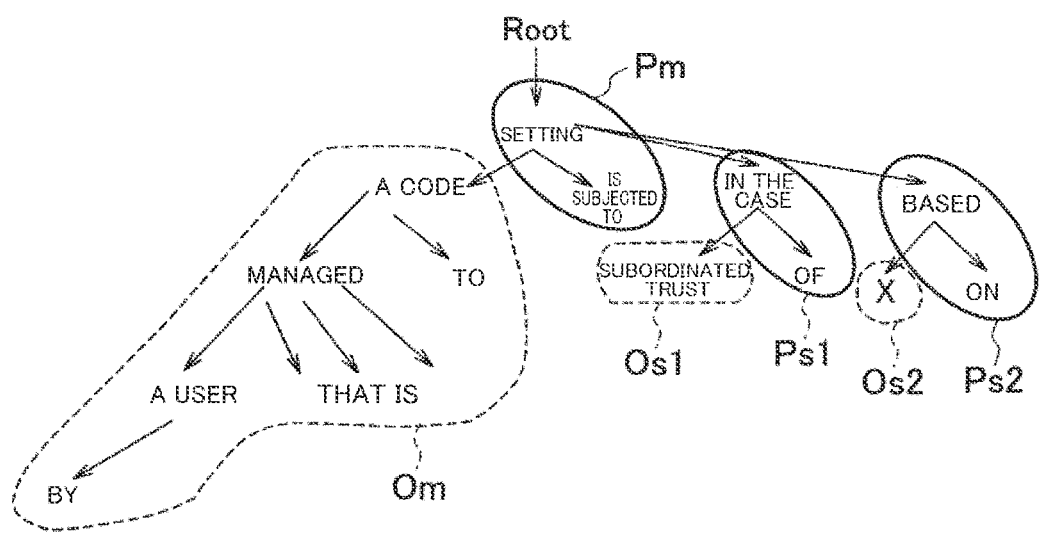
FIG. 8 is an example of an illustrative diagram in which an extracted object part is indicated on the dependence relationship tree information generated by the text data analysis information generation device according to the embodiment of the present invention.

FIG. 8 shows a diagram in which, of the dependence relationship tree information, the object Om "a code that is managed by a user" of the main triple information, the object Os1 "subordinated trust" of the secondary triple information, and the object Os2 "X" of the secondary triple information are surrounded by dotted lines.

Returning to FIG. 2, the graph information generation unit 13 generates ontology triple information that includes the predicates and objects extracted in the above-described processing, and generates graph information indicated in a graph structure based on the ontology triple information.

Figure 9:
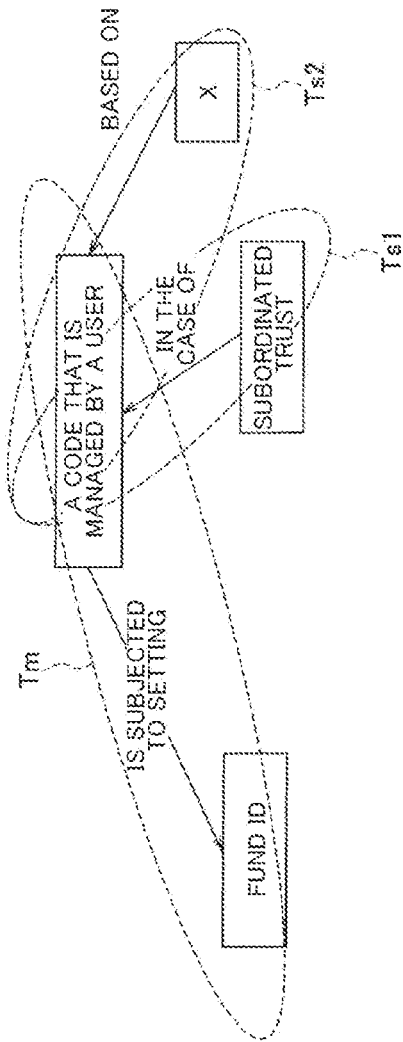
FIG. 9 illustrates an example of graph information that is generated based on triple information generated by the text data analysis information generation device according to the embodiment of the present invention.

Here, [subject "the fund ID" predicate "is subjected to setting to" object "a code that is managed by a user"] is generated as main triple information Tm, and the object of the main triple information is set as the subject of secondary triple information. [subject "a code that is managed by a user" predicate "in the case of" object "subordinated trust"] is generated as secondary triple information Ts1, and [subject "a code that is managed by a user" predicate "based on" object "X"] is generated as secondary triple information Ts2. As shown in FIG. 9, graph information is generated based thereon.

In the present embodiment, since the multiple predicates Pm, Ps1, and Ps2 are acquired from a single sentence S, and the multiple pieces of triple information are generated based on the predicates, it is possible to fully extract the knowledge information in the text.

Then, the hierarchical concept information adding unit 14 acquires broader concept information relating to the entities in the sentence S and adds it to the graph information generated by the graph information generation unit 13 (S6).

Figure 10:
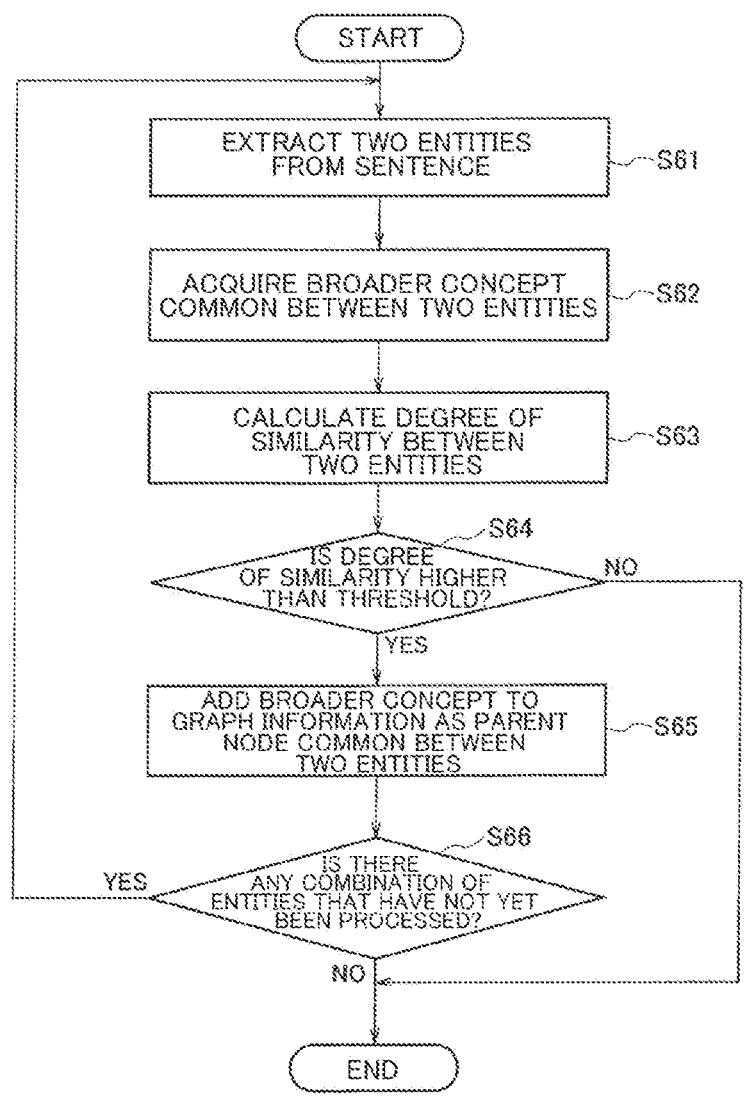
FIG. 10 is a flowchart illustrating a flow of processing for adding broader concept information to the graph information, the processing being executed by the text data analysis information generation device according to the embodiment of the present invention.

The following will describe the processing for adding the broader concept information to the graph information that is executed by the hierarchical concept information adding unit 14, with reference to the flowchart of FIG. 10.

First, two suitable entities are extracted from the sentence S (S61), and broader concept information in the lowermost layer that is common between the two entities is acquired (S62). Then, the degree of similarity between the two entities is calculated (S63).

If the calculated degree of similarity is higher than a predetermined threshold ("YES" in S64), the acquired broader concept information is added to the graph information as a parent node common between the two entities (S65). Thus, by adding broader concept information in the lowermost layer that is common between entities having a high degree of similarity in the sentence S, it is possible to generate highly versatile and accurate analysis information with respect to the data of the sentence S.

In the above-described processing for adding the broader concept information to the graph information, when suitably extracted entities are divided into words, which are smaller units than nodes of graph information, to acquire broader concept information, and the acquired broader concept information is added to the corresponding node of the graph information, it is possible to generate more versatile analysis information.

For example, an entity E1 "fund ID" and an entity E2 "subordinated trust" are extracted from the sentence S, and the entity E1 is divided into words "fund" and "ID", which are smaller units, and the entity E2 "subordinated trust" is divided into "subordinated" and "trust".

Then, broader concept information is acquired that is common between each of combinations, namely: a combination of "fund", which is one of the words of the entity E1, and "subordinated", which is one of the words of the entity E2; a combination of "fund" of the entity E1 and "trust" of the entity E2; a combination of "ID" of the entity E1 and "subordinated" of the entity E2; and a combination of "ID" of the entity E1 and "trust" of the entity E2.

Here, broader concept information "asset" is acquired with respect to the combination of "fund" of the entity E1 and "trust" of the entity E2. If there is a combination for which a broader concept is acquired, the corresponding entities are converted into vectors based on a predetermined criterion, and the degree of similarity between the entity E1 and the entity E2 is calculated based on these vectors.

Here, two entities are more similar the closer the degree of similarity is to "1", and it is assumed that the degree of similarity between the entity E1 and the entity E2 is calculated as "0.3". If it is determined that the calculated degree of similarity "0.3" is higher than a preset threshold, e.g., "0.1", the acquired broader concept information "asset" is added as a parent node that is common between the node "fund ID" and the node "subordinated trust" in the graph information.

Here, a configuration is also possible to further acquire two entities that include the acquired broader concept information are extracted, acquire broader concept information that is common between the two entities, calculate the degree of similarity between the two entities, and add the acquired broader concept information to the graph information as a parent node common between the two entities if the calculated degree of similarity is higher than a predetermined threshold.

By adding the broader concept information as described above, analysis information in which hierarchical concept information is added is generated with respect to the data of the sentence S. By saving the analysis information as knowledge information in a computer, it is possible to efficiently and accurately detect available related information if search processing relating to the corresponding knowledge is executed in the computer.

According to the above-described embodiment, it is possible to fully extract knowledge information from text data without using teaching data, and as a result of adding broader concept information relating to the text data, it is furthermore possible to generate versatile analysis information relating to the text data.

When the above-described functional configuration of the text data analysis information generation device is programmed and is assembled into a computer, it is also possible to form a text data analysis information generation program that causes the computer to function as the text data analysis information generation device.

Although the embodiment of the present invention has been described, the embodiment is given as an example and is not intended to limit the scope of the invention. This new embodiment can be implemented in various other forms, and various omissions, replacements, and changes are possible without departing from the spirit of the invention. The embodiment and the modifications thereof are included in the scope and spirit of the invention, and are included in the inventions described in the scope of the claims, and the scope equivalent thereto.

REFERENCE SIGNS LIST

1 Text data analysis information
11 Text data acquisition unit
12 Dependence relationship tree information generation unit
13 Graph information generation unit
14 Hierarchical concept information adding unit

The invention claimed is:

1. An ontology-based text data analysis information generation device comprising:
   a dependence relationship tree information generation unit, including one or more processors, configured to generate dependence relationship tree information that indicates, in a tree structure, a dependence relationship between words in text data to be analyzed;
   a graph information generation unit, including one or more processors, configured to extract a subject, a predicate, and an object from the text data based on the dependence relationship tree information, and generate graph information that indicates, in a graph structure, triple information of ontology comprising the extracted subject, predicate, and object,
      wherein the triple information of ontology includes a main triple information and a secondary triple information of the text data,
      wherein extracting the predicate comprises: (i) extracting a verb word based on a root of the dependency relationship tree information as a predicate of the main triple information, and (ii) extracting a modified word that depends on the word of the root as a predicate of the secondary triple information, and
      wherein extracting the predicate of the main triple information comprises:
         determining whether the word in the root is a verb word,
         in response to determining that the word in the root is not a verb word, adding a modified word that depends on the word of the root to the word in the root to obtain a combined verb word, and
         exacting the combined verb word as the predicate of the main triple information; and
   a hierarchical concept information adding unit, including one or more processors, configured to extract two suitable components from the text data, acquire broader concept information that is common between the two components, and add the acquired broader concept information to the graph information as a parent node that is common between the two components so as to generate text data analysis information.

2. The ontology-based text data analysis information generation device according to claim 1,
wherein the hierarchical concept information adding unit is configured to calculate a degree of similarity between the two components, and if the calculated degree of similarity is higher than a predetermined threshold, the hierarchical concept information adding unit is configured to add the acquired broader concept information to the graph information as the parent nodes common between the two components.

3. The ontology-based text data analysis information generation device according to claim 1,
wherein the hierarchical concept information adding unit is further configured to extract two components that include the acquired broader concept information, acquire broader concept information that is common between the two components, and calculate a degree of similarity between the two components, and if the calculated degree of similarity is higher than a predetermined threshold, the hierarchical concept information adding unit is configured to add the acquired broader concept information to the graph information as a parent node that is common between the two components.

4. The ontology-based text data analysis information generation device according to claim 1,
wherein the graph information generation unit is configured to extract a text part that consists of a group of words that depend on each of the extracted predicates as an object of a corresponding triple information of the text data.

5. An ontology-based text data analysis information generation method comprising:
generating dependence relationship tree information that indicates, in a tree structure, a dependence relationship between words in text data to be analyzed;
extracting a subject, a predicate, and an object from the text data based on the dependence relationship tree information, and generating graph information that indicates, in a graph structure, triple information of ontology comprising the extracted subject, predicate, and object,
wherein the triple information of ontology includes a main triple information and a secondary triple information of the text data,
wherein extracting the predicate comprises: (i) extracting a verb word based on a root of the dependency relationship tree information as a predicate of the main triple information, and (ii) extracting a modified word that depends on the word of the root as a predicate of the secondary triple information, and
wherein extracting the predicate of the main triple information comprises:
determining whether the word in the root is a verb word,
in response to determining that the word in the root is not a verb word, adding a modified word that depends on the word of the root to the word in the root to obtain a combined verb word, and
exacting the combined verb word as the predicate of the main triple information; and
adding hierarchical concept information by extracting two suitable components from the text data, acquiring broader concept information that is common between the two components, and adding the acquired broader concept information to the graph information as a parent node that is common between the two components so as to generate text data analysis information.

6. The ontology-based text data analysis information generation method according to claim 5, comprising:
calculating a degree of similarity between the two components; and
if the calculated degree of similarity is higher than a predetermined threshold, adding the acquired broader concept information to the graph information as the parent nodes common between the two components.

7. The ontology-based text data analysis information generation method according to claim 5, comprising:
extracting two components that include the acquired broader concept information, acquire broader concept information that is common between the two components;
calculating a degree of similarity between the two components; and
if the calculated degree of similarity is higher than a predetermined threshold, adding the acquired broader concept information to the graph information as a parent node that is common between the two components.

8. The ontology-based text data analysis information generation method according to claim 5,
extracting a text part that consists of a group of words that depend on each of the extracted predicates as an object of a corresponding triple information of the text data.

9. A non-transitory computer readable medium storing one or more instructions causing a computer to execute:
generating dependence relationship tree information that indicates, in a tree structure, a dependence relationship between words in text data to be analyzed;
extracting a subject, a predicate, and an object from the text data based on the dependence relationship tree information, and generating graph information that indicates, in a graph structure, triple information of ontology comprising the extracted subject, predicate, and object,
wherein the triple information of ontology includes a main triple information and a secondary triple information of the text data,
wherein extracting the predicate comprises: (i) extracting a verb word based on a root of the dependency relationship tree information as a predicate of the main triple information, and (ii) extracting a modified word that depends on the word of the root as a predicate of the secondary triple information, and
wherein extracting the predicate of the main triple information comprises:
determining whether the word in the root is a verb word,
in response to determining that the word in the root is not a verb word, adding a modified word that depends on the word of the root to the word in the root to obtain a combined verb word, and
exacting the combined verb word as the predicate of the main triple information; and
adding hierarchical concept information by extracting two suitable components from the text data, acquiring broader concept information that is common between the two components, and adding the acquired broader concept information to the graph information as a parent node that is common between the two components so as to generate text data analysis information.

10. The non-transitory computer readable medium according to claim 9, wherein the one or more instructions cause the computer to execute:
- calculating a degree of similarity between the two components; and
- if the calculated degree of similarity is higher than a predetermined threshold, adding the acquired broader concept information to the graph information as the parent nodes common between the two components.

11. The non-transitory computer readable medium according to claim 9, wherein the one or more instructions cause the computer to execute:
- extracting two components that include the acquired broader concept information, acquire broader concept information that is common between the two components;
- calculating a degree of similarity between the two components; and
- if the calculated degree of similarity is higher than a predetermined threshold, adding the acquired broader concept information to the graph information as a parent node that is common between the two components.

12. The non-transitory computer readable medium according to claim 9, wherein the one or more instructions cause the computer to execute:
- extracting a text part that consists of a group of words that depend on each of the extracted predicates as an object of a corresponding triple information of the text data.

* * * * *